US010992498B2

(12) United States Patent
Fang et al.

(10) Patent No.: US 10,992,498 B2
(45) Date of Patent: Apr. 27, 2021

(54) GATEWAY DEVICE AND SYSTEM AND METHOD FOR USE OF SAME

(71) Applicant: Enseo, Inc., Richardson, TX (US)

(72) Inventors: William C. Fang, Plano, TX (US); Raymond S. Horton, McKinney, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 46 days.

(21) Appl. No.: 16/600,766

(22) Filed: Oct. 14, 2019

(65) Prior Publication Data

US 2020/0213158 A1 Jul. 2, 2020

Related U.S. Application Data

(60) Provisional application No. 62/786,954, filed on Dec. 31, 2018.

(51) Int. Cl.
*H04L 12/40* (2006.01)
*H04L 12/66* (2006.01)
*H04L 12/28* (2006.01)
*H04L 29/06* (2006.01)

(52) U.S. Cl.
CPC .......... *H04L 12/66* (2013.01); *H04L 12/2816* (2013.01); *H04L 12/40006* (2013.01); *H04L 65/4076* (2013.01)

(58) Field of Classification Search
USPC ........................................ 370/257
See application file for complete search history.

(56) References Cited

U.S. PATENT DOCUMENTS

| | | | |
|---|---|---|---|
| 9,332,304 B2 | 5/2016 | Ogle et al. | |
| 9,344,757 B2 | 5/2016 | Ogle et al. | |
| 9,357,254 B2 | 5/2016 | Ogle et al. | |
| 9,654,826 B2 | 5/2017 | Ogle et al. | |
| 9,654,827 B2 | 5/2017 | Ogle et al. | |
| 9,712,872 B2 | 7/2017 | Ogle et al. | |
| 9,800,932 B2 | 10/2017 | Ogle et al. | |
| 9,832,490 B2 | 11/2017 | Ogle et al. | |
| 10,091,534 B2 | 10/2018 | Ogle et al. | |
| 10,104,402 B2 | 10/2018 | Ogle et al. | |
| 10,142,662 B2 | 11/2018 | Ogle et al. | |
| 10,462,881 B1* | 10/2019 | Hammett | H05B 47/16 |
| 2007/0287498 A1* | 12/2007 | Wang | H04N 21/812 |
| | | | 455/556.1 |
| 2011/0099575 A1 | 4/2011 | Woo et al. | |
| 2013/0080542 A1* | 3/2013 | Peng | H04L 67/12 |
| | | | 709/206 |

(Continued)

*Primary Examiner* — Robert J Lopata
(74) *Attorney, Agent, or Firm* — Scott Griggs; Griggs Bergen LLP

(57) ABSTRACT

A gateway device and system and method for use of the same are disclosed. In one embodiment, multiple wireless transceivers are located within a housing, which also interconnectively includes a processor, memory, and a camera. To improve convenience, the gateway device may establish a pairing with a proximate wireless-enabled interactive programmable device having a display. Virtual remote control functionality for various amenities may then be provided. To improve safety, the gateway device may be incorporated into a geolocation and safety network and, under certain conditions, the gateway device may provide a video feed.

20 Claims, 5 Drawing Sheets

(56) References Cited

U.S. PATENT DOCUMENTS

| | | | |
|---|---|---|---|
| 2013/0086245 A1* | 4/2013 | Lu | G06F 1/3212 |
| | | | 709/223 |
| 2013/0346564 A1* | 12/2013 | Warrick | H04L 41/0893 |
| | | | 709/219 |
| 2015/0256355 A1* | 9/2015 | Pera | H04L 12/2803 |
| | | | 700/90 |
| 2017/0156076 A1* | 6/2017 | Eom | H04W 24/04 |
| 2018/0077459 A1 | 3/2018 | Ogle et al. | |
| 2018/0110093 A1* | 4/2018 | Deros | H02J 50/80 |
| 2018/0167228 A1* | 6/2018 | Elcock | H04L 12/2823 |
| 2018/0167516 A1* | 6/2018 | Warrick | G10L 13/04 |
| 2018/0211666 A1* | 7/2018 | Kolavennu | G10L 13/00 |
| 2018/0220476 A1* | 8/2018 | Jung | H04W 12/06 |
| 2019/0037248 A1 | 1/2019 | Ogle et al. | |
| 2019/0045229 A1 | 2/2019 | Ogle et al. | |
| 2019/0058586 A1* | 2/2019 | Kumar | H04L 9/0866 |
| 2019/0098340 A1 | 3/2019 | Ogle et al. | |
| 2019/0190992 A1* | 6/2019 | Warrick | H04L 67/125 |
| 2019/0273749 A1* | 9/2019 | Nishimoto | H04W 12/121 |
| 2019/0342112 A1* | 11/2019 | Li | H04L 12/66 |
| 2019/0342942 A1* | 11/2019 | Deros | H01R 31/065 |
| 2020/0037004 A1* | 1/2020 | Fang | H04N 21/25841 |
| 2020/0137453 A1* | 4/2020 | Fang | H04N 21/43637 |
| 2020/0287726 A1* | 9/2020 | Garnier | H04W 12/108 |

\* cited by examiner

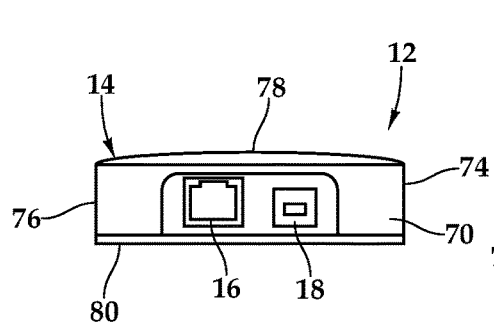
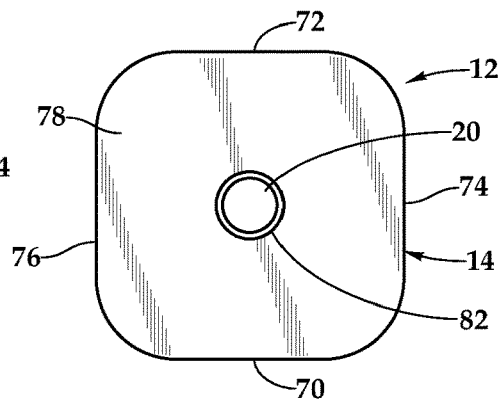
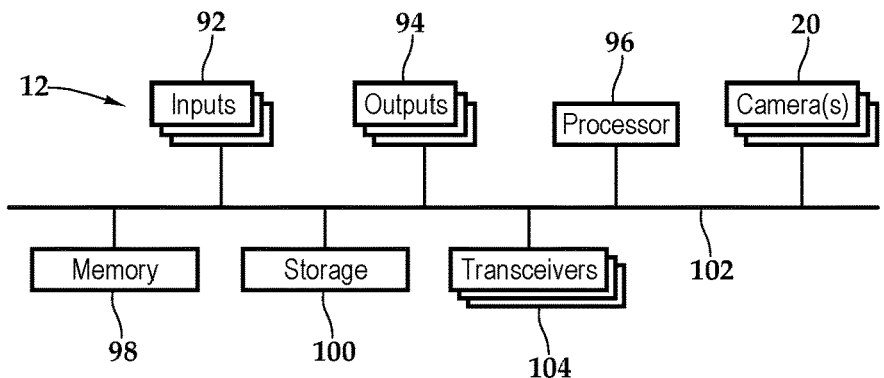
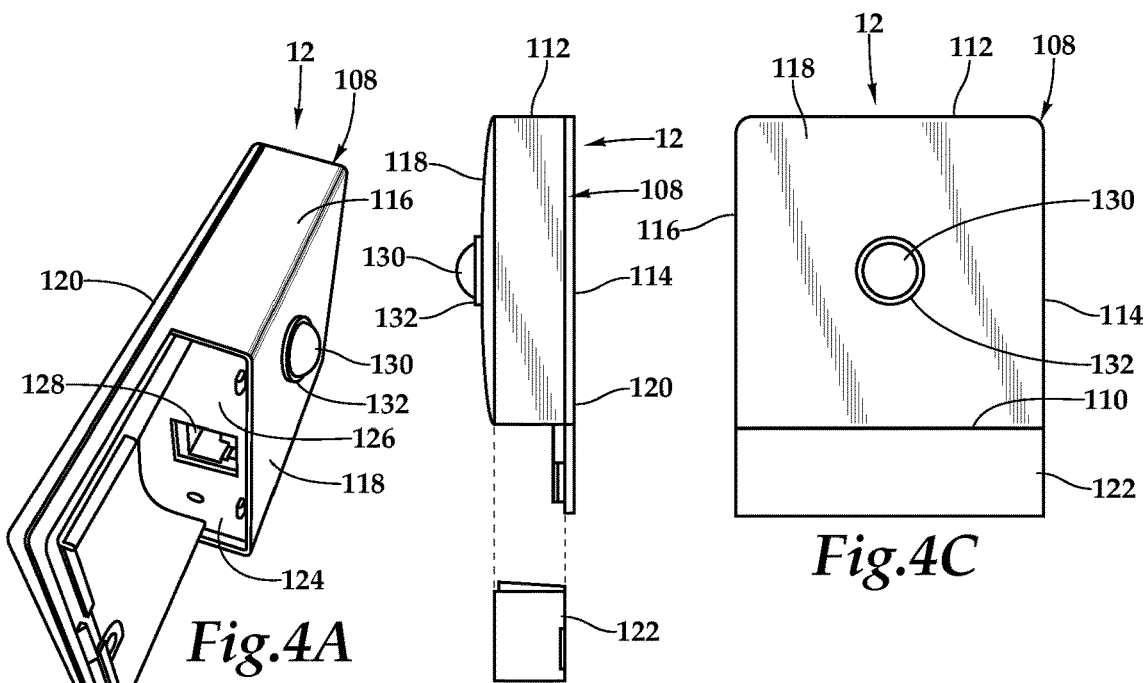

GATEWAY DEVICE AND SYSTEM AND METHOD FOR USE OF SAME

PRIORITY STATEMENT & CROSS-REFERENCE TO RELATED APPLICATION

This application claims priority from co-pending U.S. patent application Ser. No. 62/786,954 entitled "Gateway Device and System and Method for Use of Same" filed on Dec. 31, 2018, in the name of William C. Fang; which is hereby incorporated by reference for all purposes.

TECHNICAL FIELD OF THE INVENTION

This invention relates, in general, to gateway devices and, in particular, to gateway devices with enhanced convenience and systems and methods for use of the same that address and enhance the automation of solutions in a room or other environment.

BACKGROUND OF THE INVENTION

Without limiting the scope of the present invention, the background will be described in relation to the hospitality lodging industry, as an example. To many individuals, a hotel room is more than just a place to sleep, rather it is part of a larger and hopefully positive, hospitality experience. Hotel guests are seeking enhanced convenience in an easy-to-use platform to make this experience a reality. As a result of such consumer preferences, hassle free connectivity and confidence inspiring control of room amenities are differentiators in determining the experience of guests staying in hospitality lodging establishments. Accordingly, there is a need for improved systems and methods for providing enhanced convenience in an easy-to-use platform in the hospitality lodging industry.

SUMMARY OF THE INVENTION

It would be advantageous to achieve a gateway device that would improve upon existing limitations in functionality. It would be desirable to enable a computer-based electronics and software solution that would provide enhanced convenience in an easy-to-use platform in the hospitality lodging industry or in another environment. Further, it would also be desirable to enable a computer-based electronics and software solution that would provide improved safety in a reliable platform. To better address one or more of these concerns, a gateway device and system and method for use of the same are disclosed. In one embodiment of the gateway device, multiple wireless transceivers are located within a housing, which also interconnectively includes a processor and memory.

The gateway device may establish a pairing with a proximate wireless-enabled interactive programmable device having a display and various amenities. Content, such as the Internet, movies, music, or games, for example, may be imported, e.g., streamed, from the programmable device and reformatted at the gateway device for rendering on one of the amenities. Virtual remote control functionality of the amenities may also be provided. To improve safety, the gateway device may be incorporated into a geolocation and safety network and, under certain conditions, the gateway device may provide a video feed. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 2A is a top plan view of one embodiment of the gateway device depicted in FIG. 1 in further detail;

FIG. 2B is a front elevation view of the gateway device depicted in FIG. 2A;

FIG. 3 is a functional block diagram depicting one embodiment of the gateway device presented in FIGS. 2A and 2B;

FIG. 4A is a front perspective view of another embodiment of a gateway device;

FIG. 4B is a side elevation view of the gateway device depicted in FIG. 4A;

FIG. 4C is a top plan view of the gateway device depicted in FIG. 4A;

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
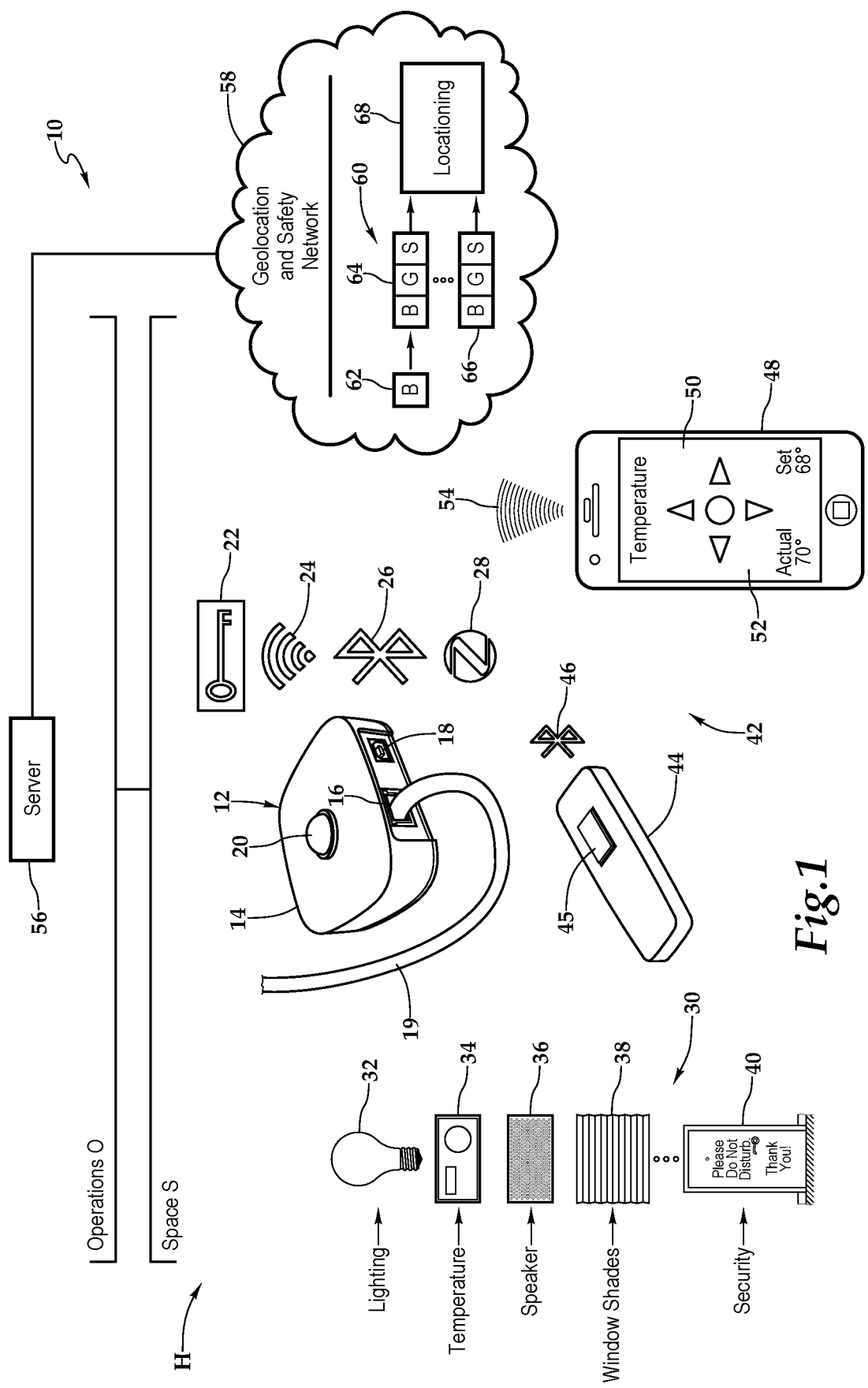
FIG. 1 is a schematic diagram depicting one embodiment of a system for providing a gateway device providing enhanced convenience and safety functionality therewith according to the teachings presented herein.

Referring initially to FIG. 1, therein is depicted one embodiment of a system 10 utilizing a gateway device 12 with enhanced content capabilities and safety capabilities being employed within a hospitality lodging establishment. The hospitality lodging establishment or, more generally, hospitality property, may be a furnished multi-family residence, dormitory, lodging establishment, hotel, hospital, or other multi-unit environment. As shown, by way of example and not by way of limitation, the hospitality environment is depicted as the hotel H having various rooms and spaces, including space S and back of the house operations O. As will be discussed in additional detail, the gateway device 12 is communicatively disposed with various amenities associated with the hospitality environment or hotel H as well as a geolocation and safety network 58. Gateway devices, like the gateway device 12, may be deployed throughout the spaces S and rooms of the hotel H.

As shown, in one embodiment, within the space S, which may be a hallway or lobby, for example, the system 10 includes the gateway device 12 having a housing 14 with physical connections 16, 18. A network cable 19 is secured to physical connection 16. In one embodiment, the gateway device 12 includes a camera 20. A configuration profile 22 provides the information and credentials necessary for the gateway device 12 to have convenient connections to amenities and a safe experience for the guests as well as workers at the hotel H through the geolocation and safety network 58, as will be described below. Multiple antennas provide for the wireless capabilities of the gateway device 12 and include, for example, wireless standards: Wi-Fi 24, Bluetooth 26, and ZigBee 28. More generally, it should be appreciated that the cabling connected to the gateway device 12 and antenna configuration will depend on the environment and application, and the cabling connections and wireless standards presented in FIG. 1 are depicted for illustrative purposes.

The gateway device 12 communicates wirelessly with various amenities 30, which are depicted as environmental amenities, within an environment of the space S. As shown, the amenities may include lighting 32, a thermostat 34 representing temperature control, a speaker 36, window shades 38, and security 40, which is depicted as a door indication for "Please Do Not Disturb." A programmable device 42 that may be proximate and serve as a personal location device, such as a single button programmable device 44 having a button 45 with Bluetooth capabilities 46 or a proximate wireless-enabled interactive programmable device 48 may be in communication with the gateway device 12 by a wireless standard. As shown, the proximate wireless-enabled interactive programmable device 48 may be a wireless-enabled interactive handheld device that may be supplied or carried by the guest and may be selected from a range of existing devices, such as, for example personal computers, laptops, tablet computers, smart phones, and smart watches, for example. In one implementation, an application installed from a server enables the gateway device 12 and the proximate wireless-enabled interactive programmable device to be wirelessly paired. In another embodiment, a challenge-response is utilized to wirelessly pair the gateway device 12 and the proximate wireless-enabled interactive programmable device 48.

As shown, the configuration profile 22 is loaded within the gateway device 12. The guest configuration profile 22 may be loaded from the operations, e.g., the front desk or hotel headend, by use of a remote control, or by a proximate device, such as the proximate wireless-enabled interactive programmable device 48. The configuration profile 22 enables, in operation, to query the status of one of the amenities, to furnish virtual remote control functionality of the amenities 30 that may be provided by the proximate wireless-enabled interactive programmable device 48, and to import content from the proximate wireless-enabled interactive programmable device 48 to one of the amenities 30, such as the speaker 36. Such functionality is depicted by the proximate wireless-enabled interactive programmable device 48 having a display 50 and a virtual interface 52 thereon for controlling the temperature of the temperature control amenity 34 by way of a Wi-Fi wireless signal 54 that is received by the gateway device 12 and transmitted to the temperature control 34.

In another implantation, the gateway device 12 has a data link to the server 56 which is providing a geolocation and safety network 58, which includes the gateway device 12 as well as the programmable device 42 in the form of the single button programmable device 44 or the proximate wireless-enabled interactive programmable device 48. In one implementation, an individual has the programmable device 44, which may transmit a beacon from the programmable device 44 using a wireless standard such as Bluetooth 46 to the gateway device 12. The gateway device then processes the received beacon signal and sends a broadcast signal to the server 56. More particularly, with respect to data flow 60, the programmable device 44 transmits the beacon signal 62 which includes a personal location device identification identifying the programmable device 44. The beacon signal 62 is received by the gateway device 12 which transmits a broadcast signal 64 including the personal location device identification, a gateway device identification identifying the gateway device 12, and a signal characteristic indicator, such as signal strength, for example. The server 56 receives the broadcast signal 64 and uses multiple broadcast signals, including broadcast signal 66, for locationing 68, such as triangulation, of the location of the programmable device 44. The server 56, in turn, sends out the appropriate notifications to various phones, activates alarms, or notify others via a computer, depending on the situation. In one implementation, under certain conditions, such as an alert-enabled mode and an emergency, the camera 20 may be actuated by the gateway device 12 to send video to the server 56. As a spatial array of horizontal and vertical gateway devices are provided, the server 56 and system 10 presented herein is able to determine the location of the individual associated with the programmable device 44 within a building. The location information determined includes which floor the individual is presently located as well as the room or common area.

Referring to FIG. 2A, FIG. 2B, and FIG. 3, the gateway device 12 may be a set-top unit that is an information appliance device that does not include television-tuner functionality and generally contains convenience and safety functionality. The gateway device 12 includes the housing 14 having a front wall 70, rear wall 72, side wall 74, side wall 76, top wall 78, and bottom base 80. It should be appreciated that front wall, rear wall, and side wall are relative terms used for descriptive purposes and the orientation and the nomenclature of the walls may vary depending on application. The front wall 70 includes various ports, ports 16, 18 that provide interfaces for various interfaces, including inputs 92 and outputs 94. In one implementation, as illustrated, the port 16 is an RJ45 port and port 18 is a USB2 port. It should be appreciated that the configuration of ports may vary with the gateway device depending on application and context. As shown, the top wall 78 includes a camera securement 82 for the camera 20.

Within the housing 14, a processor 96, memory 98, storage 100, the inputs 92, the outputs 94, and one or more cameras 20 are interconnected by a bus architecture 102 within a mounting architecture. The processor 96 may process instructions for execution within the computing device, including instructions stored in the memory 98 or in storage 100. The memory 98 stores information within the computing device. In one implementation, the memory 98 is a volatile memory unit or units. In another implementation, the memory 98 is a non-volatile memory unit or units. Storage 100 provides capacity that is capable of providing mass storage for the gateway device 12. Various inputs 92 and outputs 94 provide connections to and from the computing device, wherein the inputs 92 are the signals or data received by the gateway device 12, and the outputs 94 are the signals or data sent from the gateway device 12. As mentioned, the one or more cameras 20 are each an optical instrument for capturing still images or for recording moving images, which are stored in a physical medium such as in a digital system. The camera 20 may send the captured images to the server 56 under certain conditions.

Multiple transceivers 104 are associated with the gateway device 12 and communicatively disposed with the bus 102. As shown the transceivers 104 may be internal, external, or a combination thereof to the housing. Further, the transceivers 104 may be a transmitter/receiver, receiver, or an antenna for example. Communication between various amenities in the hotel room and the gateway device 12 may be enabled by a variety of wireless methodologies employed by the transceiver 152, including 802.11, 802.15, 802.15.4, 3G, 4G, Edge, Wi-Fi, ZigBee, near field communications (NFC), Bluetooth low energy and Bluetooth, for example. Also, infrared (IR) may be utilized.

The memory 98 and storage 100 are accessible to the processor 96 and include processor-executable instructions that, when executed, cause the processor 96 to execute a series of operations. With respect to first processor-executable instructions, the processor 96 is caused to establish a pairing between the proximate wireless-enabled interactive programmable device 48 and the gateway device 12. The processor-executable instructions then send user interface instructions relative to the amenity to the proximate wireless-enabled interactive programmable device 48. The instructions may further cause the processor 96 to receive and process user input instructions relative to the amenity 30 from the proximate wireless-enabled interactive programmable device 48. The processor-executable instructions may also cause the processor 96 to generate a command signal and send the command signal to the amenity 30.

The memory 98 may also include second processor-executable instructions that, when executed, cause the processor 96 to receive and process a beacon signal including a personal location device identification. The instructions may then cause the processor 96 to generate a broadcast signal including the personal location device identification, a gateway device identification, and signal characteristics indicator. Finally, the instructions may cause the processor 96 to send the broadcast signal to the server 56.

The memory 98 may also include third processor-executable instructions that, when executed, cause the processor 96 to establish a pairing between the proximate wireless-enabled interactive programmable device 48 and the gateway device 12. Following the establishment of a pairing, the processor-executable instructions may cause the processor 96 to send user interface instructions relative to the amenity 30 to the proximate wireless-enabled interactive programmable device 48. The instructions may then cause the processor 96 to receive and process user input instructions relative to the amenity 30 from the proximate wireless-enabled interactive programmable device 48. As part of the status inquiry process, the processor-executable instructions may then generate a status inquiry, send the status inquiry to the amenity 30, receive a response to the status inquiry at the gateway device 12, and forward a status response to the proximate wireless-enabled interactive programmable device 48.

The memory 98 may include fourth processor-executable instructions that, when executed, cause the processor 96 to establish a pairing between the proximate wireless-enabled interactive programmable device 48 and the gateway device 12 and then send user interface instructions relative to the amenity 30 to the proximate wireless-enabled interactive programmable device 48. The processor-executable instructions may further cause the processor 96 to receive and process user input instructions relative to the amenity 30 from the proximate wireless-enabled interactive programmable device 48. Then, the processor 96 may be caused to import content from the proximate wireless-enabled interactive programmable device 48, reformat the imported content, and forward the reformatted imported content to the amenity 30.

The memory 98 may include fifth processor-executable instructions that, when executed, cause the processor 96 to capture video via the camera and transmit the video to the server. It should be appreciated that various conditions may be present for the camera to initiate the capturing of images and transmission thereof. For example, in one implementation, in response to receiving and processing the beacon signal in the alerts-enabled mode, the processor-executable instructions cause the processor to capture video via the camera. In another implementation, in response to receiving and processing a signal from the server, the processor-executable instructions cause the processor to capture video via the camera.

Thus, the systems and methods disclosed herein may enable users to use existing electronic devices as a temporary remote control device to control various amenities. Therefore the systems and methods presented herein avoid the need for additional or expensive high functionality remote controls. In this respect, the teachings presented herein also include providing the software and/or application for the electronic device or interactive handheld device. The application, to the extent needed, may be downloaded from the Internet or alternatively made available by download from the set-top box. Further, the systems and methods disclosed herein may enable users to be part of a geolocation and safety network.

FIGS. 4A, 4B, and 4C depict another embodiment of the gateway device 12. The gateway device 12 includes the housing 108 having a front wall 110, rear wall 112, side wall 114, side wall 116, top wall 118, and bottom base 120. It should be appreciated that front wall, rear wall, and side wall are relative terms used for descriptive purposes and the orientation and the nomenclature of the walls may vary depending on application. The front wall 110 includes a removable cover 122 and inside, at opening 124, is interior wall 126 which may have various ports, such as port 128. The gateway device 12 also includes a camera 130 positioned within the camera securement 132 within the top wall 118. It should be appreciated that the configuration of ports may vary with the gateway device depending on application and context. The gateway device 12 depicted in FIGS. 4A, 4B, and 4C may be employed in an outdoor environment, for example, where interfaces require additional protection from the elements.

Figure 5:
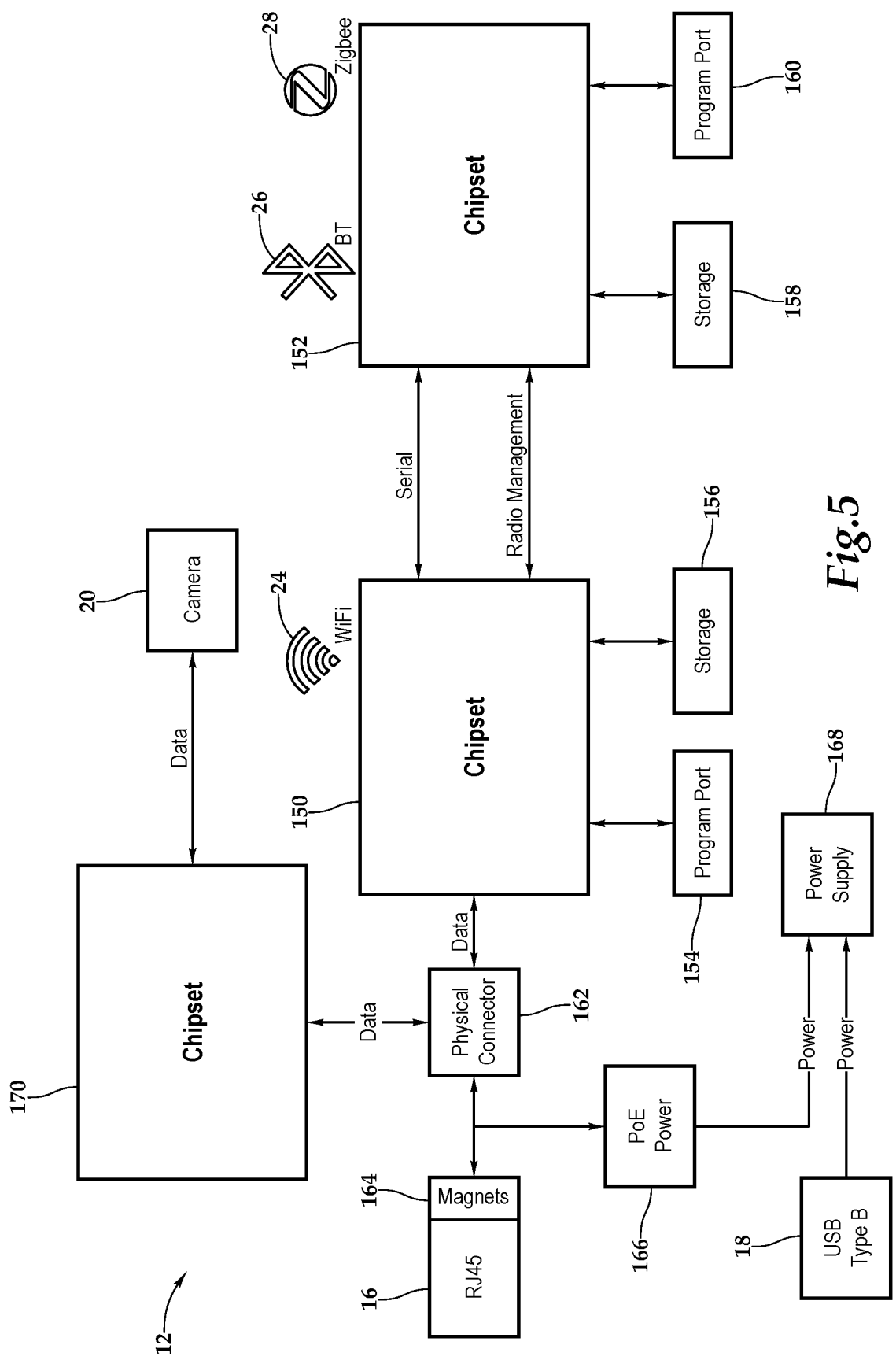
FIG. 5 is a functional block diagram depicting one operational embodiment of the gateway device shown in FIG. 3.

FIG. 5 depicts one embodiment of the gateway device 12. In this embodiment, chipsets 150, 152 respectively include a program port 154, storage 156 and storage 158 and a program port 160. The chipset 150 includes an antenna for wireless protocol Wi-Fi 24, while the chipset 152 includes antennas for wireless protocol Bluetooth 26 and wireless protocol ZigBee 28. Serial and radio management communications are enabled between the chipset 150 and the chipset 152. A physical connector 162 is connected to the chipset 150 to provide data thereto. The source of the data is the RJ45 port 16, which includes coupling magnet components 164. The RJ45 port 16 may also provide power of Ethernet which is received by power of Ethernet circuit component 166 and forwarded to the power supply 168. In the illustrated embodiment, the USB Type B port 18 may also provide power to the power supply 168. As shown, the physical connector 162 connects the chipset 170 to the camera 20.

Figure 6:
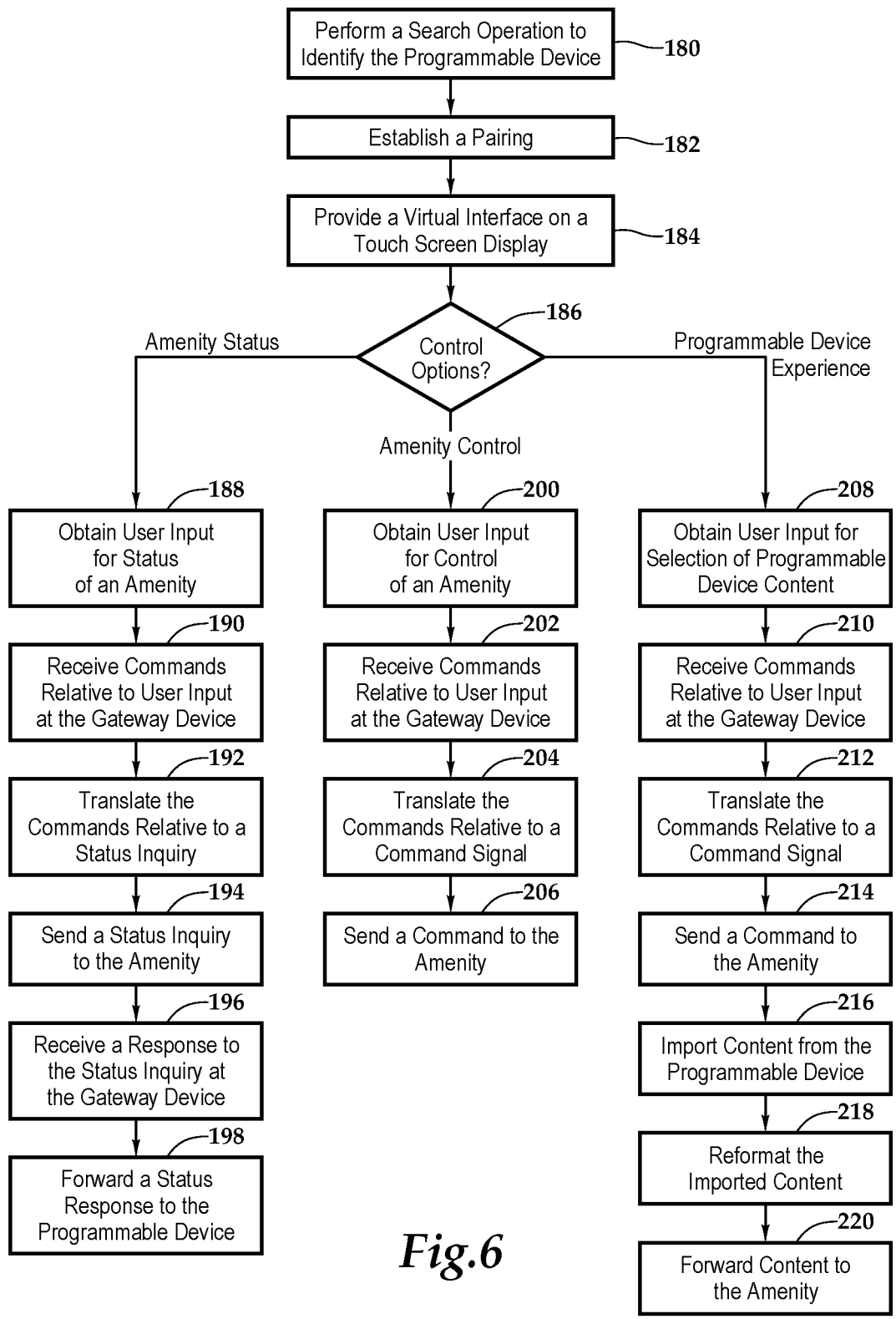
FIG. 6 is a flow chart depicting one embodiment of a method for providing a gateway device having enhanced convenience according to the teachings presented herein.

FIG. 6 depicts one embodiment of a method for providing convenience through a remote control device controlling amenities, according to the teachings presented herein. At block 180, a search, which may be active or passive, is performed by the gateway device to identify a physically proximate programmable device in the multi-room environment, for example. At block 182, a pairing is established. As noted by block 184, the pairing may provide an experience that includes providing a virtual interface with virtual buttons, for example. Referring to decision block 186, as previously discussed, the virtual remote controls and interface each correspond to amenities under the control of the gateway device and, as a result, the status may be determined of the amenity, the amenity may be controlled, or a programmable device experience may be initiated.

With respect to amenity status, at block 188, instructions are provided to the proximate wireless-enabled interactive programmable device to enable requests for the status of an amenity. At block 190, commands are received at the gateway device relative to user input and a status inquiry. At block 192, the commands are translated and at block 194 a status inquiry is sent to the amenity. At block 196, a response to the status inquiry is received at the gateway device and forwarded to the proximate wireless-enabled interactive programmable device at block 198.

With respect to control of amenities, at block 200, instructions are provided from the gateway device for a virtual interface on a touch screen display associated with the proximate wireless-enabled interactive programmable device. In one embodiment, the virtual buttons are associated with the proximate wireless-enabled interactive programmable device and relate to obtaining user input for the amenity control functionality provided by the set-top box. At block 202, the set-top box receives and processes amenity control functionality input instructions from the proximate wireless-enabled interactive programmable device. At block 204, the commands are translated into a command signal. At block 206, the command signal is sent to the particular amenity.

Returning now to decision block 186 and the importation of content from the proximate wireless-enabled interactive programmable device, at block 208, instructions are provided from the gateway device for an interface including virtual buttons, for example, on a touch screen display associated with the proximate wireless-enabled interactive programmable device. The virtual buttons may be associated with the proximate wireless-enabled interactive programmable device and relate to obtaining user input for the programmable device experience functionality provided by the gateway device. At block 210, the gateway device receives and processes virtual remote control functionality input instructions from the proximate wireless-enabled interactive programmable device. At block 212, the commands are translated into a command signal and sent to the amenity at block 214. At block 216, content is imported from the proximate wireless-enabled interactive programmable device. At block 218, the imported content is reformatted for the targeted amenity and forwarded thereto at block 220. As discussed, the fully tuned signal including the imported content provides an upstream parallel experience on the television related to the content on the proximate wireless-enabled interactive programmable device.

Figure 7:
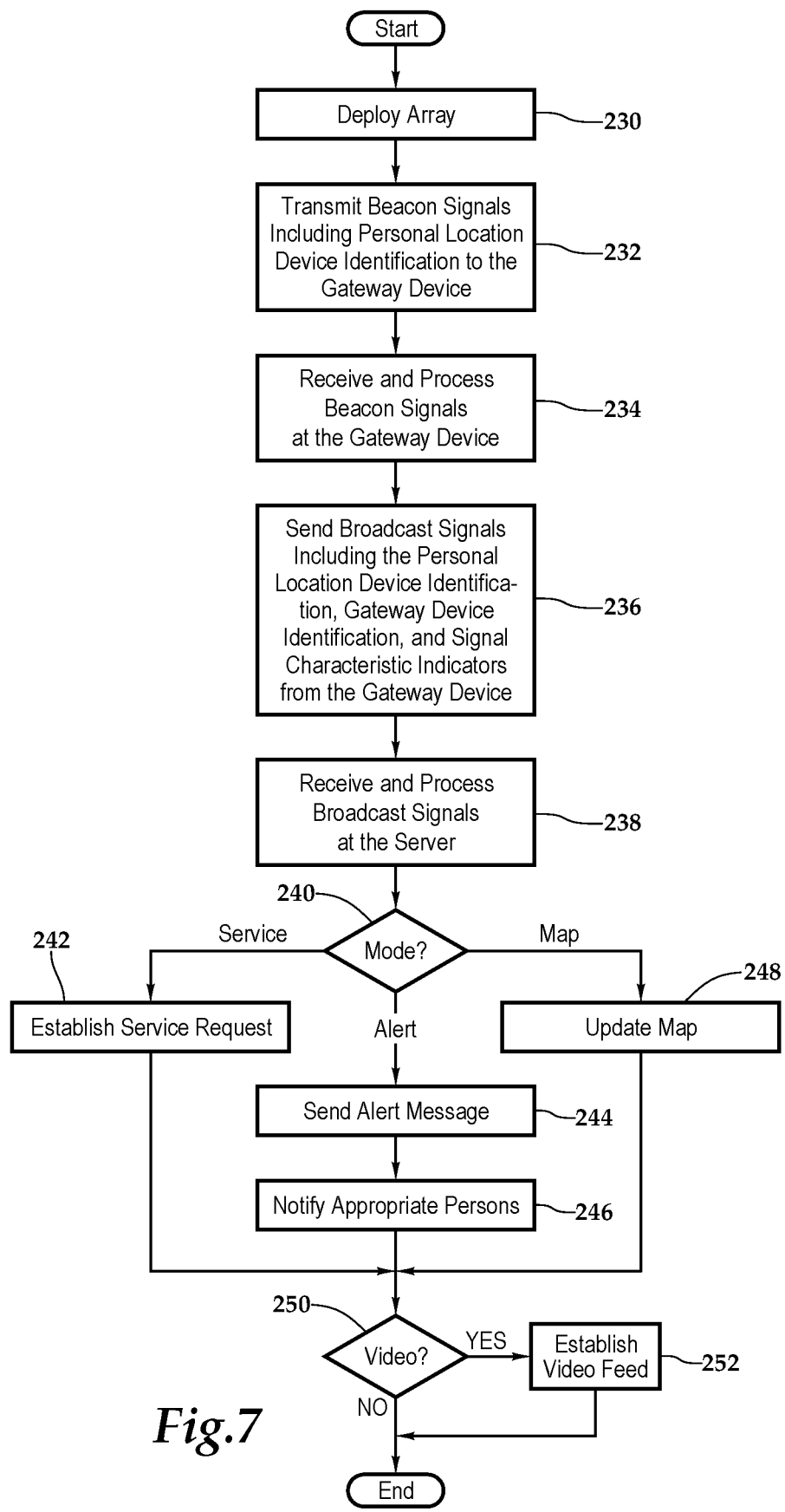
FIG. 7 is a flow chart depicting one embodiment of a method for providing a gateway device furnishing enhanced safety according to the teachings presented herein.

FIG. 7 depicts one embodiment of a method for providing safety in a hospitality environment or other environment, according to the teachings presented herein. At block 230, the array of gateway devices is deployed vertically and horizontally throughout the hospitality environment. At block 232, beacon signals are periodically transmitted from personal location devices and received by the gateway devices.

At block 234, the beacon signals are received and processed at the gateway device. The beacon signals may include a personal location device identification corresponding to the device being employed by the user. In one embodiment, signal strength between the beacon transmission of the set-top boxes and the common area beacons at the wireless-enabled interactive programmable device is measured. In other embodiments, phase angle measurements or flight time measurements may be utilized. At block 236, broadcast signals are sent from the gateway devices to a server that is part of the geolocation and safety network. The broadcast signals may include the personal location device identification, gateway device identification, and signal characteristic indicators. At block 238, the server receives and processes the broadcast signals. At this step, the server may identify the location of the origin of the beacon signal and estimate the location of the personal location device. At decision block 240, the server takes action based on the mode of operation. In a first mode of operation at block 242, a service request is associated with the location of the user utilizing the location of the personal location device such as the wireless-enabled interactive programmable device as a proxy. In a second mode of operation at block 244, an emergency alert is sent and subsequent notification (block 246) occurs. The emergency alert includes an indication of distress and the location of the user utilizing the location of the wireless-enabled interactive programmable device as a proxy. In a third mode of operation at block 248, the map of individuals is updated with the location of the user with, if privacy settings being enabled, the system maintains the privacy of the individual working in the hospitality environment such that the system only retains in memory the last known position and time of the user-supplied wireless-enabled smart and interactive handheld device. Further, in this mode of operation, the system does not reveal the location of the individual and programmable device unless and until an alert is issued. Following the modes of operation, at decision block 250, if a video feed is required, then the methodology advances to block 252 where a video feed is established. By way of example and not by way of limitation, a video feed may be required to complete a service request, support an alert request, or provide a visual image to supplement the map. If a video feed is not required, then the methodology may conclude. If a video feed is required, then the video feed may include cameras from devices in communication with the geolocation and safety network that are located near the estimated location of the personal location device.

The gateway device and systems and methods presented herein are particularly applicable to non-hotel guest room applications like hallways as well as the aforementioned educational environments, including hallways, gymnasiums, cafeterias and libraries. In such applications, the cameras on the gateway devices may be activated by a signal from the server following an alert, for example. Alternatively, the cameras may self-actuate following an alert from a personal location device. The video feed or video feeds received at the server may be utilized by safety and security personal or law enforcement to assess the situation.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A gateway device comprising:
   a housing securing a processor, memory, storage, and a camera therein, the housing being configured to be located within a space;
   a busing architecture communicatively interconnecting the processor, the memory, the storage, and the camera;
   a first physical port secured at the housing and coupled to the busing architecture, the first physical port configured to provide a physical wired interface for data and power to the gateway device;
   a second physical port secured at the housing and coupled to the busing architecture, the second physical port configured to provide a physical wired interface for power to the gateway device;
   a plurality of wireless transceivers associated with the housing and coupled to the busing architecture, the plurality of wireless transceivers configured to communicate via a plurality of wireless standards;
   at least one of the plurality of wireless transceivers and the first physical port providing a data link to a server, the server managing a geolocation and safety network including a plurality of gateway devices;
   at least one of the plurality of wireless transceivers being configured to communicate with a proximate programmable device;
   at least one of the plurality of wireless transceivers being configured to communicate with a proximate amenity, the proximate amenity being co-located with the gateway device at the space;
   the memory accessible to the processor, the memory including first processor-executable instructions that, when executed, cause the processor to:
      establish a pairing between the proximate programmable device and the gateway device,
      send user interface instructions relative to the amenity to the proximate programmable device,
      receive and process user input instructions relative to the amenity from the proximate programmable device,
      generate a command signal, and
      send the command signal to the amenity;
   the memory accessible to the processor, the memory including second processor-executable instructions that, when executed, cause the processor to:
      receive and process a beacon signal including a personal location device identification,
      generate a broadcast signal including the personal location device identification, a gateway device identification, and signal characteristics indicator, and
      send the broadcast signal to the server; and
   the memory accessible to the processor, the memory including third processor-executable instructions that, when executed, cause the processor to:
      in response to receiving and processing the beacon signal including an alert, capture video via the camera, and
      transmit the video the server.

2. The gateway device as recited in claim 1, wherein the first physical port further comprises an RJ45 port.

3. The gateway device as recited in claim 1, wherein the second physical port further comprises a USB2 port.

4. The gateway device as recited in claim 1, wherein the wireless standards are selected from a group consisting of infrared (IR), 802.11, 802.15, 802.15.4, 3G, 4G, Edge, Wi-Fi, ZigBee, near field communications (NFC), and Bluetooth.

5. The gateway device as recited in claim 1, wherein the plurality of wireless transceivers are at least partially internal to the housing.

6. The gateway device as recited in claim 1, wherein the plurality of wireless transceivers are at least partially external to the housing.

7. The gateway device as recited in claim 1, wherein each of the plurality of wireless transceivers further comprise an antenna.

8. The gateway device as recited in claim 1, wherein the proximate programmable device comprises a device selected from the group consisting of personal computers, laptops, tablet computers, smart phones, and smart watches.

9. The gateway device as recited in claim 1, wherein the proximate programmable device further comprises a proximate wireless-enabled interactive programmable device.

10. The gateway device as recited in claim 1, wherein the proximate programmable device further comprises a single button programmable device.

11. The gateway device as recited in claim 1, wherein the amenity is selected from a group consisting of lighting control, temperature control, speakers, window shade control, and door security.

12. The gateway device as recited in claim 1, wherein the signal characteristics indicator is based on the beacon signal being received at the gateway device.

13. The gateway device as recited in claim 12, wherein the signal characteristics indicator is selected from a group consisting of signal strength measurements, phase angle measurements, and flight time measurements.

14. The gateway device as recited in claim 1, wherein the beacon signal further comprises an operational mode selected from the group consisting of alerts-enabled, service request-enabled, tracking-enabled, and non-tracking-enabled.

15. The gateway device as recited in claim 14, wherein in the alerts-enabled mode, the server receives a distress signal from the proximate programmable device.

16. The gateway device as recited in claim 14, wherein in the service-request-enabled mode, the server receives a service request from the proximate programmable device.

17. The gateway device as recited in claim 14, wherein in the tracking-enabled mode, the server maintains in memory a plurality of estimated locations with timestamps associated with the proximate programmable device.

18. The gateway device as recited in claim 14, wherein in the non-tracking-enabled mode, the server maintains in memory only the last known locations with timestamps associated with the proximate programmable device.

19. A gateway device comprising:
   a housing securing a processor, memory, storage, and a camera therein, the housing being configured to be located within a space;

a busing architecture communicatively interconnecting the processor, the memory, the storage, and the camera;
a first physical port secured at the housing and coupled to the busing architecture, the first physical port configured to provide a physical wired interface for data and power to the gateway device;
a second physical port secured at the housing and coupled to the busing architecture, the second physical port configured to provide a physical wired interface for power to the gateway device;
a plurality of wireless transceivers associated with the housing and coupled to the busing architecture, the plurality of wireless transceivers configured to communicate via a plurality of wireless standards;
at least one of the plurality of wireless transceivers and the first physical port providing a data link to a server, the server managing a geolocation and safety network including a plurality of gateway devices;
at least one of the plurality of wireless transceivers being configured to communicate with a proximate programmable device;
at least one of the plurality of wireless transceivers being configured to communicate with a proximate amenity, the proximate amenity being co-located with the gateway device at the space;
the memory accessible to the processor, the memory including first processor-executable instructions that, when executed, cause the processor to:
 establish a pairing between the proximate programmable device and the gateway device,
 send user interface instructions relative to the amenity to the proximate programmable device,
 receive and process user input instructions relative to the amenity from the proximate programmable device,
 generate a command signal, and
 send the command signal to the amenity;
the memory accessible to the processor, the memory including second processor-executable instructions that, when executed, cause the processor to:
 receive and process a beacon signal including a personal location device identification,
 generate a broadcast signal including the personal location device identification, a gateway device identification, and signal characteristics indicator, and
 send the broadcast signal to the server; and
the memory accessible to the processor, the memory including third processor-executable instructions that, when executed, cause the processor to:
 capture video via the camera, and
 transmit the video the server.

20. A gateway device comprising:
a housing securing a processor, memory, storage, and a camera therein, the housing being configured to be located within a space;
a busing architecture communicatively interconnecting the processor, the memory, the storage, and the camera;
a first physical port secured at the housing and coupled to the busing architecture, the first physical port configured to provide a physical wired interface for data and power to the gateway device;
a second physical port secured at the housing and coupled to the busing architecture, the second physical port configured to provide a physical wired interface for power to the gateway device;
a plurality of wireless transceivers associated with the housing and coupled to the busing architecture, the plurality of wireless transceivers configured to communicate via a plurality of wireless standards;
at least one of the plurality of wireless transceivers and the first physical port providing a data link to a server, the server managing a geolocation and safety network including a plurality of gateway devices;
at least one of the plurality of wireless transceivers being configured to communicate with a proximate programmable device;
the memory accessible to the processor, the memory including first processor-executable instructions that, when executed, cause the processor to:
 receive and process a beacon signal including a personal location device identification, the beacon signal including an operational mode selected from the group consisting of alerts-enabled, service request-enabled, tracking-enabled, and non-tracking-enabled,
 generate a broadcast signal including the personal location device identification, a gateway device identification, and signal characteristics indicator, and
 send the broadcast signal to the server; and
the memory accessible to the processor, the memory including second processor-executable instructions that, when executed, cause the processor to:
 in response to receiving and processing the beacon signal in the alerts-enabled mode, capture video via the camera, and
 transmit the video the server.

* * * * *